United States Patent Office 3,469,072
Patented Sept. 23, 1969

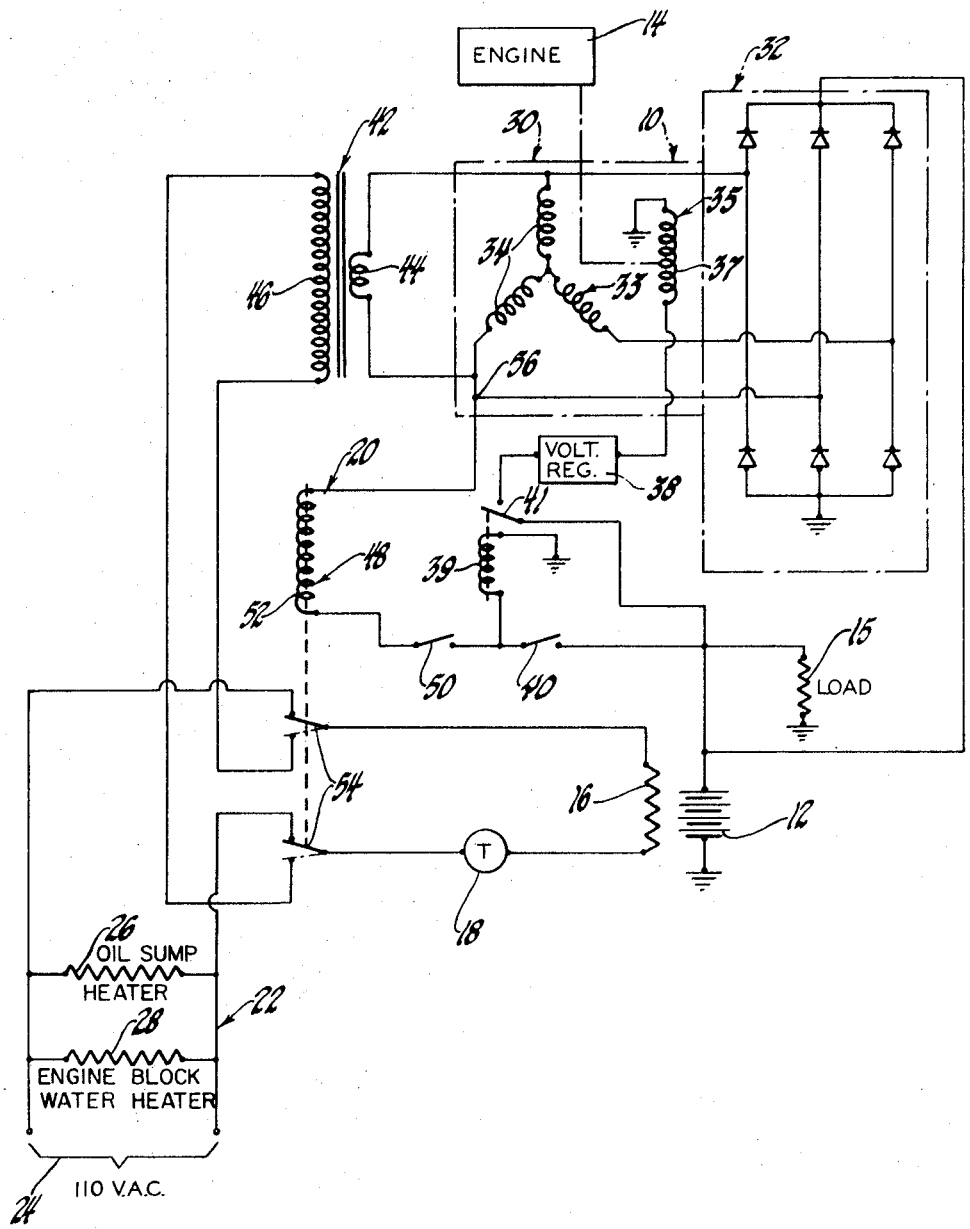

3,469,072
ELECTRIC HEATING SYSTEM FOR MOTOR VEHICLES
Richard A. Carlson, Pontiac, Mich., assignor to General Motors Corporation, Detroit, Mich., a corporation of Delaware
Filed Dec. 11, 1964, Ser. No. 417,665
Int. Cl. B60l 1/02
U.S. Cl. 219—202    14 Claims

ABSTRACT OF THE DISCLOSURE

A heater system for protecting a motor vehicle battery against low environmental temperatures that utilizes a single electric heater associated with the battery that can be selectively operated either by external station AC power when the vehicle is parked or by AC power of the same voltage derived from the vehicle's power generating system when the vehicle is in operation. The system includes provision for isolating the external station power from the vehicle power generating system and also provision for isolating the battery heater from the battery. The system additionally includes provision for heating with the external station power other vehicle engine components, such as the coolant and lubrication systems.

---

This invention relates generally to heater systems and, more particularly, to systems adapted, although not exclusively, to heat vehicle batteries and various systems associated with a vehicle engine.

When motor vehicles, such as trucks, are to be operated in extremely cold weather, provision must be made for not only protecting the battery but also the coolant and lubrication systems, particularly when the truck is to be parked for relatively long periods of time. Even when the truck is being operated, the battery may have to be protected if its environmental temperature is too low. The invention provides for such in a unique and different way by utilizing a single battery heater that can be operated either by the vehicle power generating system or by external station power.

The system further provides a novel arrangement for, when appropriate, not only isolating this station power from the vehicle generating system, but also the battery heater from the vehicle energy storage system.

Additionally, provision is made for heating with station power various engine systems, such as the cooling and lubrication systems.

The foregoing and other objects and advantages of the invention will become apparent from the following description and the accompanying drawing, in which the single figure illustrates schematically a heater system incorporating the principles of the invention.

Referring now to the drawing, the numeral 10 denotes generally a vehicle electricity generating system that both charges a conventional vehicle battery 12 and supplies power for starting an engine 14 and operating the various accessories, which are represented by a load resistor 15. The battery temperature is maintained at some selected safe level by a battery heater 16, which may be of the resistance coil type, and a suitable temperature sensitive device; for instance, a conventional thermostat 18 adjusted to the selected tempertaure. A control, designated generally by the numeral 20, operates in a way to be explained to connect the battery heater 16 either to the generating system 10 or to a supply circuit 22, which can be connected to a station power source 24 that supplies the usual 60 cycle, 110 volt AC power. The supply circuit 22 also includes an oil sump heater 26 for the engine lubrication system and an engine block water heater 28 for the coolant system. Both of these heaters 26 and 28 may too be of the resistance coil type and can be incorporated into their respective systems in any well known fashion.

The generating system 10 employs a suitable alternator 30 and a rectifier 32, such as the illustrated Delcotron generator made by the Delco-Remy Division of General Motors Corporation. As illustrated, the alternator 30 comprises a stator 33 with three windings 34 Y-connected to provide a three-phase AC output and a rotor 35 with a field winding 37 appropriately driven by the engine 14. The rectifier 32 utilizes the illustrated diode matrix to convert the three-phase AC output from the alternator 30 to a DC output. Any appropriate voltage regulator 38 may be employed; for instance, that utilized by the Delcotron generator. This voltage regulator 38 is rendered operative by a field relay 39 when a vehicle run switch 40 is closed to commence engine operation. The resultant DC output will energize the field relay 39 and cause its contacts 41 to close so that now the DC output is applied to the rotor field winding 37, the value being varied by the voltage regulator 38 so as to maintain the DC output relatively constant. By way of example only, this DC output can be 12 volts, assuming that the conventional 12 volt vehicle system is being utilized. The battery 12 will be charged and the load 15 energized in the usual manner by this DC output.

As mentioned, the battery heater 16 can be energized either by the station power source 24 or by the generating system 10. The latter is accomplished by a step-up transfomer 42 that has its primary 44 connected across two of the stator windings 34, as demonstrated, so as to receive low voltage single-phase AC power from the alternator 30 and a secondary 46 with an appropriate number of turns for increasing the voltage to that of the station power source 24. This will involve a step-up from 12 volts to the required 110 volts.

The control 20, which connects either the station power source 24 or the transformer 42 to the battery heater 16, includes a switching provision, such as a relay 48, and a heat switch 50. The relay 48 has a relay winding 52 and a pair of relay contacts 54. One end of the relay winding 52 is preferably connected, as shown, to a terminal 56 of the alternator 32 and the other end to the heat switch 50. With the heat switch 50 and the vehicle run switch 40 closed and the alternator 30 developing an output, the relay winding 52 will have applied thereto a half-wave rectified substantially DC potential, which is approximately of a square wave configuration. The average value of this potential is adequate to maintain the relay winding 52 energized and move the pair of contacts 54 from their normal, i.e., deenergized, solid line position, to the energized broken line position. In this broken line position the secondary 46 of the transformer 42 is connected to the battery heater 16 and, hence, the battery heater 16 will be supplied with the AC power developed by the alternator 30 and stepped up by the transformer 42. These contacts 54 can be returned to their normal solid line position in which the battery heater 16 is connected to the supply circuit 22 and the relay 48 is deenergized either by opening the heat switch 50 or by stopping the engine.

It should be noted that the end of the heat switch 50 adjacent the vehicle run switch 40 can be grounded rather than connected directly to the positive terminal of the battery 12 and, in effect, connected to the negative terminal of the battery 12. Whether connected to the negative or to the positive terminal no current is drawn by the relay 48 from the battery 12 when the alternator 30 is inoperative because of the blocking action of the rectifier diodes. Consequently, the relay 48 will be deenergized and the pair of contacts 54 will be in their normal solid line position.

The operation will be briefly summarized by first assuming that the truck is parked and the engine is inoperative or not running. With these conditions both the heat switch 50 and the vehicle run switch 40 would normally be open. Hence, there being no available energizing force for the relay 48, the pair of contacts 54 will be in their normal solid line position and the supply circuit 22 connected to the battery heater 16. If the vehicle operator wishes to use the supply circuit 22 he will connect the supply circuit 22 to the station power source 24, and the battery heater 16 will become operative to maintain the battery temperature at the setting of the thermostat 18. At the same time, both the oil sump heater 26 and the water heater 28 will become operative and respectively maintain the lubrication and coolant systems at their proper temperature.

If now it is desired to operate the vehicle, the station power source 24 is disconnected from the vehicle and the vehicle is operated in the normal manner. However, if the ambient temperature demands that the battery temperature be maintained at a safe level, the operator will close the heat switch 50; then when the vehicle run switch 40 is closed and the alternator 30 is developing an output, the relay 48 will be energized and the pair of contacts 54 moved to the broken line position. The power for operating the battery heater 16 is, as previously described, obtained from the alternator 30, then stepped up to the proper AC voltage. Therefore, it will be appreciated the battery heater 16 can use power from the generating system 10 without any alteration, i.e., any change in the battery heater 16, since it receives substantially the same type of power.

As will be appreciated, power from the station power source 24 cannot be fed back into the generating system 10 because of the described action of the pair of contacts 54 in isolating the generating system 10 from the station power source 24. Also, the battery 12 cannot discharge into the battery heater 16 because of the generator diodes and the isolating characteristics of the transformer 42.

The invention is to be limited only by the following claims.

What is claimed is:

1. In an engine driven vehicle, the combination of an electric power generating system driven by the engine, the generating system having plural AC outputs, means rectifying one of the AC outputs so as to provide a DC output, an energy storage battery connected to the DC output, means transforming the AC output to certain voltage and current values, an electric heater for the battery, and control means for selectively connecting the electric heater to the AC output from the transforming means or to an external station power source of the certain voltage and current values, the control means including switching means interconnected between the generating system and the battery so that the battery is prevented from discharging therethrough by the rectifying means when the generating system is inoperative, the switching means being arranged to be actuated by the generating system when operative so as to connect the heater to the AC output from the transforming means when the engine is operative and isolating the heater from the generating system when the engine is inoperative so that the heater can be connected to the external station power source.

2. In an engine driven vehicle, the combination of an electric power generating system driven by the engine and arranged when operative to provide a series of AC outputs, means rectifying one of the AC outputs so as to provide a DC output, an energy storage battery connected to the DC output, means transforming the AC output to certain voltage and current values, an electric heater for the battery, and control means for selectively connecting the electric heater to the AC output from the transforming means or to an external station power source of the certain voltage and current values, the control means including relay means interconnected between the generating system and the battery so that the battery is prevented from discharging therethrough by the rectifying means when the generating system is inoperative, the relay means being arranged to be actuated by the generating system when operative so as to connect the heater to the AC output and when the generating system is inoperative to isolate the heater from the AC output so that the heater can be connected to the exernal station power source.

3. In an engine driven vehicle, the combination of an electric power generating system driven by the engine, the power generating system being arranged when operative to provide a series of AC outputs, means rectifying one of the AC outputs so as to provide plural DC outputs, an energy storage battery connected to one of the DC outputs, an electric heater for the battery and control means for selectively connecting the electric heater to the power generating system or to an external station power source, the control means including relay means interconnected between the generating system and the battery so that another of the DC outputs is applied to the relay means when the generating system is operative and so that the battery is prevented from discharging therethrough by the rectifying means when the generating system is inoperative, the relay means being arranged to connect another of the AC outputs to the heater when the generating system is operative and to isolate the heater from the generating system when the generating system is inoperative so that the heater can be connected to the external station power source.

4. In an engine driven vehicle; the combination of an electric power generating system; the power generating system including an alternator adapted to be driven by the engine and so constructed as to provide both polyphase and single phase AC outputs and means rectifying the polyphase output so as to provide a plurality of DC outputs; an energy storage battery communicating with one of the DC outputs; an electric heater for the battery; and control means for selectively connecting the electric heater to the single phase AC output or to an external station power source; the control means comprising relay means interconnected with the generating system and the battery so that another of the DC outputs is applied to the relay means when the alternator is operative and so that the battery is prevented from discharging therethrough by the rectifying means when the alternator is inoperative, the relay means being arranged to connect the single phase AC output to the heater when the alternator is operative and to isolate the heater from the single phase AC output when the alternator system is inoperative so that the heater can be connected to the external station power source.

5. In an engine driven vehicle; the combination of an electric power generating system driven by the engine; the generating system including an alternator arranged when operative to develop a series of AC outputs and means rectifying one of the AC outputs, the rectifying means comprising a series of rectifiers so poled as to provide both half wave and full wave rectified outputs; an energy storage battery communicating with the full wave rectified output; an electric heater for the battery; circuit means adapted to connect the eleceric heater to a station power source of a certain power level; means transforming the other AC output to the certain power level; and control means for the heater; the control means including relay means interconnected between the generating system and the battery so that the half wave rectified output is applied to the relay means when the alternator is operative and so that discharge of the battery therethrough is prevented by the rectifying means when the alternator is inoperative; the relay means being arranged to connect the transforming means to the battery heater and when the alternator is inoperative to connect the heater to the circuit means while isolating the transforming means from the heater, and switch means operative to selectively apply the half wave rectified output to the relay means.

6. In an engine driven vehicle; the combination of an electric power generating system driven by the engine; the power generating system including an alternator arranged when operative to develop both a polyphase AC output and a single phase AC output and rectifying means communicating with the polyphase AC output, the rectifying means including a series of rectifiers so poled as to convert the polyphase AC output to a DC output; means regulating the outputs from the alternator; an energy storage battery communicating with the DC output; an electric heater for the battery; circuit means adapted to connect the heater to a station power source of a certain power level; a transformer so arranged as to convert the single phase AC output to the certain power level of the station power source; and control means for the heater; the control means including relay means interconnected between the generating system and the battery so that a rectified potential is applied to the relay means when the alternator is operative and so that discharge of the battery therethrough is prevented by the rectifying means when the alternator is inoperative, the relay means being so arranged as to be energized by the rectified potential to connect the transformer to the heater and when the alternator is inoperative to connect the heater to the circuit means while isolating the heater from the transformer.

7. In combination, an engine, an electric power generating system driven by the engine and arranged to provide plural AC outputs, means rectifying one of the AC outputs so as to provide a DC output, an energy storage source connected to the DC output, means transforming the AC output to certain voltage and current values, an electric heater for the source, and control means for selectively connecting the electric heater to the AC output from the transforming means or to an external station power source of the certain voltage and current values, the control means including switching means interconnected between the generating system and the battery so that the battery is prevented from discharging therethrough by the rectifying means when the generating system is inoperative, the switching means being arranged to be actuated by the generating system when operative so as to connect the heater to the AC output from the transforming means when the engine is operative and isolating the heater from the generating system when the engine is inoperative so that the heater can be connected to the external station power source.

8. In combination, an engine, an electric power generating system driven by the engine, the power generating system being arranged when operative to provide a series of AC outputs, means rectifying one of the AC outputs so as to provide plural DC outputs, an energy storage battery communicating with one of the DC outputs, an electric heater for the battery, control means for selectively connecting the electric heater to the other AC output or to an external station power AC source, the control means including relay means interconnected between the generating system and the battery so that another of the DC outputs is applied to the relay means when the generating system is operative and so that the battery is prevented from discharging therethrough by the rectifying means when the generating system is inoperative, the relay means being arranged to connect the heater to the another of the AC outputs when the generating system is operative and to isolate the generating system from the heater when the generating system is inoperative so that the heater can be connected to the external station power source.

9. In combination; an engine; an electric power generating system driven by the engine; the power generating system including an alternator driven by the engine and arranged when operative to provide a single phase AC output and a polyphase AC output and means rectifying the polyphase AC output so as to develop a plurality of DC outputs; an energy storage battery communicating with one of the DC outputs; an electric heater for the battery; control means for selectively connecting the electric heater to the single phase AC output or to an external station power AC source; and control means for the heater; the control means including relay means interconnected with the generating system and the battery so that another of the DC outputs is applied to the relay means when the alternator is operative and so that the battery is prevented from discharging therethrough by the rectifying means when the alternator is inoperative, the relay means being arranged to connect the single phase AC output to the heater when the alternator is operative and to isolate the single phase AC output from the heater when the alternator is inoperative so that the heater can be connected to the external station power AC source.

10. In combination, an engine, an eletcric power generating system driven by the engine, the power generating system including an alternator driven by the engine and arranged when operative to develop both a polyphase AC output and a single phase AC output and rectifying means communicating with the polyphase AC output, the rectifying means including a series of rectifiers so poled as to convert the polyphase AC output to a DC output; an energy storage battery communicating with the DC output; an electric heater for the battery adapted to be selectively connectable to the AC source and to an external station power AC source, circuit means adapted to connect the heater to an external station power AC source of a certain power level; a transformer so arranged as to convert the single phase AC output to the certain power level of the station power source; and control means for the heater; the control means including relay means interconnected between the generating system and the battery so that a rectified potential is applied to the relay means when the alternator is operative and so that discharge of the battery therethrough is prevented by the rectifying means when the alternator is inoperative, the relay means being so arranged as to be energized by the rectified potential to connect the transformer to the heater and when the alternator is inoperative to be deenergized to connect the heater to the circuit means while isolating the heater from the transformer; and temperature responsive means for controlling the heater so as to maintain the battery at some predetermined temperature level.

11. In a motor vehicle, the combination comprising an engine having cooling and lubrication systems, electric power generating means driven by the engine, the generating means having plural AC outputs, means rectifying one of the AC outputs so as to provide a DC output, an energy storage battery connected to the DC output, means transforming the AC output to certain voltage and current values, circuit means including heater means for each of the cooling and lubrication systems and adapted to be connected to an external station power source of the certain voltage and current values, an electric heater for the battery, and control means including switching means interconnected between the generating system and the battery so that the battery is prevented from discharging therethrough by the rectifying means when the generating system is inoperative, the switching means being arranged to be actuated by the generating system when operative so as to connect the electric heater to the AC output from the transforming means when the engine is operative and to the circuit means when the engine is inoperative.

12. In a motor vehicle, the combination comprising an engine having cooling and lubrication systems, electric power generating means driven by the engine, the generating means being arranged when operative to provide a series of AC outputs, means rectifying one of the series AC outputs so as to provide plural DC outputs, an energy storage battery connected to one of the DC outputs, circuit means including heater means for each the cooling and lubrication systems adapted to be connected to an external station power AC source, an electric heater for the battery, and control means for the electric heater, the control means including relay means interconnected between the generating system and the battery so that another of the DC outputs is applied to the relay means when the generating means is operative and so that the battery is prevented from discharging therethrough by the rectifying means when the generating system is inoperative, the relay means being arranged to connect another of the AC outputs to the heater when the generating means is operative and to connect the circuit means to the heater when the generating means is inoperative.

13. In a motor vehicle; the combination comprising an engine having cooling and lubrication systems; electric power generating means driven by the engine; the power generating means including an alternator arranged when operative to provide a polyphase AC output and a single phase AC output and means rectifying the polyphase output so as to provide a plurality of DC outputs; an energy storage battery communicating with one of the DC outputs; circuit means including heater means for each the cooling and lubrication systems and adapted to be connected to an external station power AC source; an electric heater for the battery; and control means for the battery; the control means including relay means interconnected with the generating means and the battery so that another of the DC outputs is applied to the relay means when the alternator is operative and so that the battery is prevented from discharging therethrough by the rectifying means when the alternator is inoperative, the relay means being arranged to connect the single phase AC output to the heater when the alternator is operative and to connect the heater to the circuit means when the alternator is inoperative.

14. In a motor vehicle; the combination comprising an engine having cooling and lubrication systems; electric power generating means including an alternator driven by the engine and arranged when operative to develop a series of AC outputs and means rectifying one of the AC outputs so as to provide plural DC outputs; an energy storage battery connected to one of the plural DC outputs; circuit means including heater means for each the cooling and lubrication systems and adapted to be connected to an external station power AC source of a certain power level; an electric heater for the battery; means transforming the another of the AC outputs to the certain power level; and control means for the heater; the control means including relay means interconnected with the generating means and the battery so that another of the plural DC outputs is applied to the relay means when the alternator is operative and so that the battery is prevented from discharging therethrough by the rectifying means when the alternator is inoperative, the relay means being arranged to connect the heater to the transforming means when the alternator is operative to connect the heater to the circuit means when the alternator is inoperative; and temperature responsive means for maintaining the temperature of the battery relatively constant.

References Cited

UNITED STATES PATENTS

| | | | |
|---|---|---|---|
| 1,550,524 | 8/1925 | Eremeeff | 219—202 |
| 1,861,809 | 6/1932 | McCaleb | 123—142.5 |
| 2,611,853 | 9/1952 | Kerby | 219—209 |
| 2,731,807 | 1/1956 | Allyne | 165—42 X |
| 2,819,373 | 1/1958 | Allman | 219—202 |
| 2,856,543 | 10/1958 | Dixon et al. | 290—2 X |
| 3,180,403 | 4/1965 | Breen | 165—42 X |
| 3,174,048 | 3/1965 | Snyder et al. | 307—10 |
| 3,300,619 | 1/1967 | Nilssen | 219—202 X |

ANTHONY BARTIS, Primary Examiner

U.S. Cl. X.R.

123—142.5; 165—41; 219—205, 209; 237—12.3; 290—2; 307—10